US 11,509,180 B2

(12) United States Patent
Koga

(10) Patent No.: US 11,509,180 B2
(45) Date of Patent: Nov. 22, 2022

(54) STATOR

(71) Applicant: AISIN CORPORATION, Kariya (JP)

(72) Inventor: Kiyotaka Koga, Nishio (JP)

(73) Assignee: AISIN CORPORATION, Kariya (JP)

( * ) Notice: Subject to any disclaimer, the term of this patent is extended or adjusted under 35 U.S.C. 154(b) by 236 days.

(21) Appl. No.: 16/764,359

(22) PCT Filed: Nov. 29, 2018

(86) PCT No.: PCT/JP2018/044063
§ 371 (c)(1),
(2) Date: May 14, 2020

(87) PCT Pub. No.: WO2019/116918
PCT Pub. Date: Jun. 20, 2019

(65) Prior Publication Data
US 2020/0280231 A1    Sep. 3, 2020

(30) Foreign Application Priority Data

Dec. 14, 2017   (JP) .............................. JP2017-239227

(51) Int. Cl.
| | |
|---|---|
| H02K 3/28 | (2006.01) |
| H02K 1/16 | (2006.01) |
| H02K 1/274 | (2022.01) |
| H02K 3/12 | (2006.01) |
| H02K 3/48 | (2006.01) |
| H02K 15/085 | (2006.01) |

(52) U.S. Cl.
CPC ................ *H02K 3/28* (2013.01); *H02K 1/16* (2013.01); *H02K 1/274* (2013.01); *H02K 3/12* (2013.01); *H02K 3/48* (2013.01); *H02K 15/085* (2013.01)

(58) Field of Classification Search
CPC .. H02K 3/28; H02K 1/16; H02K 3/12; H02K 15/085
See application file for complete search history.

(56) References Cited

U.S. PATENT DOCUMENTS

| | | | | |
|---|---|---|---|---|
| 6,396,185 B1 * | 5/2002 | Asao | ........................ | H02K 3/28 310/179 |
| 6,424,071 B1 * | 7/2002 | Oohashi | .................... | H02K 3/12 310/263 |
| 6,462,453 B1 * | 10/2002 | Asao | ........................ | H02K 3/28 310/260 |

(Continued)

FOREIGN PATENT DOCUMENTS

| | | |
|---|---|---|
| JP | 2015-084635 A | 4/2015 |
| JP | 2017-158255 A | 9/2017 |
| WO | 2016/153001 A1 | 9/2016 |

OTHER PUBLICATIONS

Nov. 9, 2020 Supplementary Search Report issued in European Patent Application No. 18888913.3.

(Continued)

*Primary Examiner* — Robert W Horn
(74) *Attorney, Agent, or Firm* — Oliff PLC

(57) ABSTRACT

In this stator, a first coil portion, a second coil portion, a third coil portion, and a fourth coil portion each include a one-side coil part that is disposed so as to extend over a first slot and a third slot, and an other-side coil part that is disposed so as to extend over a second slot and a fourth slot.

10 Claims, 9 Drawing Sheets

(56) References Cited

U.S. PATENT DOCUMENTS

| | | | | |
|---|---|---|---|---|
| 6,472,790 | B2* | 10/2002 | Rose, Sr. | F02N 11/04 |
| | | | | 310/179 |
| 6,717,317 | B2* | 4/2004 | Akita | H02K 15/0081 |
| | | | | 310/201 |
| 9,455,605 | B2* | 9/2016 | Saito | H02K 21/14 |
| 10,320,255 | B2* | 6/2019 | Schulz | H02K 3/28 |
| 10,879,829 | B2* | 12/2020 | Severson | H02P 27/08 |
| 11,056,944 | B2* | 7/2021 | Suwazono | H02K 1/16 |
| 2005/0164528 | A1* | 7/2005 | Furguth | H02K 15/0056 |
| | | | | 439/71 |
| 2015/0054374 | A1* | 2/2015 | Neet | H02K 3/28 |
| | | | | 310/198 |
| 2015/0076953 | A1 | 3/2015 | Tamura | |
| 2016/0172919 | A1* | 6/2016 | Hattori | H02K 3/48 |
| | | | | 29/596 |
| 2017/0040859 | A1 | 2/2017 | Langlard | |
| 2018/0026487 | A1 | 1/2018 | Koga | |
| 2018/0269741 | A1 | 9/2018 | Koga | |
| 2020/0136457 | A1* | 4/2020 | Lee | H02K 3/48 |
| 2020/0280231 | A1* | 9/2020 | Koga | H02K 3/28 |
| 2021/0376680 | A1* | 12/2021 | Yang | H02K 3/28 |

OTHER PUBLICATIONS

Feb. 12, 2019 International Search Report issued in International Patent Application No. PCT/JP2018/044063.

\* cited by examiner

STATOR

TECHNICAL FIELD

The preferred embodiment relates to a stator.

BACKGROUND ART

Conventionally, a stator having coil portions that have the same phase and that are connected in parallel to each other is known. Such a stator is disclosed, for example, in WO 2016/153001.

The above-mentioned WO 2016/153001 discloses a rotary electrical machine including a first concentric coil (coil portion), a second concentric coil, a third concentric coil, and a fourth concentric coil that have the same phase and that are each formed by concentrically winding a rectangular conductive wire. The first concentric coil, the second concentric coil, the third concentric coil, and the fourth concentric coil are connected in parallel with each other. The first concentric coil, the second concentric coil, the third concentric coil, and the fourth concentric coil each have the following: a one-side concentric coil with a coil center positioned on one side in a circumferential direction with respect to a center of the magnetic pole; and an other-side concentric coil with a coil center positioned on the other side in the circumferential direction with respect to the center of the magnetic pole. Ends (lead wire portions) of the rectangular conductive wires that form the one-side concentric coil and the other-side concentric coil are connected to each other on an upper side (axially outer side) of a coil end portion. Further, the coil center means a center position in the circumferential direction, between two slots in which a pair of slot-housed portions are each disposed. In addition, the center of the magnetic pole means a center position in the circumferential direction, between the coil centers of the two concentric coils that are electrically connected to each other.

In WO 2016/153001, the first concentric coil, the second concentric coil, the third concentric coil, and the fourth concentric coil each have the following: the one-side concentric coil with the coil center positioned on the one side in the circumferential direction with respect to the center of the magnetic pole; and the other-side concentric coil with the coil center positioned on the other side in the circumferential direction with respect to the center of the magnetic pole. Thus, it is possible to prevent the concentric coil from being disposed only on the one side in the circumferential direction or only on the other side in the circumferential direction, with respect to the center of the magnetic pole. That is, the relationship (balance) of the position of the concentric coil with respect to the center of the magnetic pole is the same in the first concentric coil, the second concentric coil, the third concentric coil, and the fourth concentric coil. Therefore, the generation of a resistance difference between the first concentric coil, the second concentric coil, the third concentric coil, and the fourth concentric coil is suppressed. This reduces the generation of circulating current in the first concentric coil, the second concentric coil, the third concentric coil, and the fourth concentric coil, thereby reducing the generation of noise and vibration.

RELATED ART DOCUMENTS

Patent Documents

Patent Document 1: WO 2016/153001

SUMMARY OF THE INVENTION

Problem to be Solved by the Invention

However, in the rotary electrical machine of WO 2016/153001, although the generation of noise and vibration caused by circulating current is reduced, the connecting portion that connects the one-side concentric coil and the other-side concentric coil of each of the first to fourth concentric coils need to be disposed so as to pass over and avoid the coil end portions of the other concentric coils. Thus, there is a problem that the length of the stator in a central axis direction or a radial direction is increased.

The invention has been made to solve the above problem and one object of the invention is to reduce generation of noise and vibration caused by circulating current in a coil while suppressing an increase of the side of the stator in the central axis direction or the radial direction.

Means for Solving the Problem

In order to achieve the above object, the stator according to one aspect of the preferred embodiment includes: a stator core provided with a plurality of slots; and a coil that is disposed in the slot of the stator core and in which a conductive wire is wave-wound. The coil includes a first coil portion, a second coil portion, a third coil portion, and a fourth coil portion that have the same phase and that are connected in parallel with each other. Among the slots, a slot on one side of the two adjacent slots in a circumferential direction is a first slot, a slot on the other side in the circumferential direction is a second slot, a slot that is disposed at a position separated from the first slot to the other side in the circumferential direction by a predetermined number of slots is a third slot, and a slot that is adjacent to the third slot on the other side in the circumferential direction is a fourth slot. The first coil portion, the second coil portion, the third coil portion, and the fourth coil portion each include a one-side coil part that is disposed so as to extend over the first slot and the third slot in the circumferential direction and an other-side coil part that is disposed so as to extend over the second slot and the fourth slot in the circumferential direction.

In the stator according to one aspect of the preferred embodiment, as described above, the first coil portion, the second coil portion, the third coil portion, and the fourth coil portion are configured by wave-winding a conductive wire. Here, the wave-wound conductive wire disposed in the stator core is configured such that after being disposed in one slot so as to extend from the one side to the other side in the axis direction, the wave-wound conductive wire is disposed in the slot so as to extend along an end face of the stator core and extend from the other side toward the one side in the axis direction, in another slot different from the one slot. The conductive wire described above is repeatedly disposed for a plurality of times with wave-winding and thus, the conductive wire is disposed over the entire circumference of the stator core. That is, with the wave-winding, the number of times of passing over the other same-phase coils connected in parallel can be reduced, compared to concentric winding. Thus, an increase in the length of the stator in the central axis direction or the radial direction can be suppressed. The first coil portion, the second coil portion, the third coil portion, and the fourth coil portion each include a one-side coil part that is disposed so as to extend over the first slot and the third slot in the circumferential direction and an other-side coil part that is disposed so as to extend over the second slot and the fourth slot in the circumferential direction. Thereby, it is possible to suppress variation in the relationship (balance) between the position of the coil with respect to the center of the magnetic pole, unlike the case where each of the first coil portion, the second coil portion, the third coil portion, and the fourth coil portion extends over only the first slot (third slot) on one side in the circumferential direction or only the second slot (fourth slot) on the other side in the circumferential direction. As a result, it is possible to reduce generation of circulating current in the first coil portion, the second coil portion, the third coil portion, and the fourth coil portion and thus, it is possible to reduce generation of noise and vibration. Therefore, it is possible to reduce generation of noise and vibration caused by circulating current in the coil while suppressing an increase in the size of the stator in the central axis direction or the radial direction.

According to the preferred embodiment, as described above, it is possible to reduce generation of noise and vibration caused by circulating current in the coil while suppressing an increase in the size of the stator in the central axis direction or the radial direction.

MODES FOR CARRYING OUT THE INVENTION

An embodiment of the preferred embodiment will be described below based on the drawings.

Present Embodiment (Structure of Stator)

The structure of a stator 100 (rotary electrical machine 200) according to the present embodiment will be described with reference to FIGS. 1 to 10.

Figure 1:
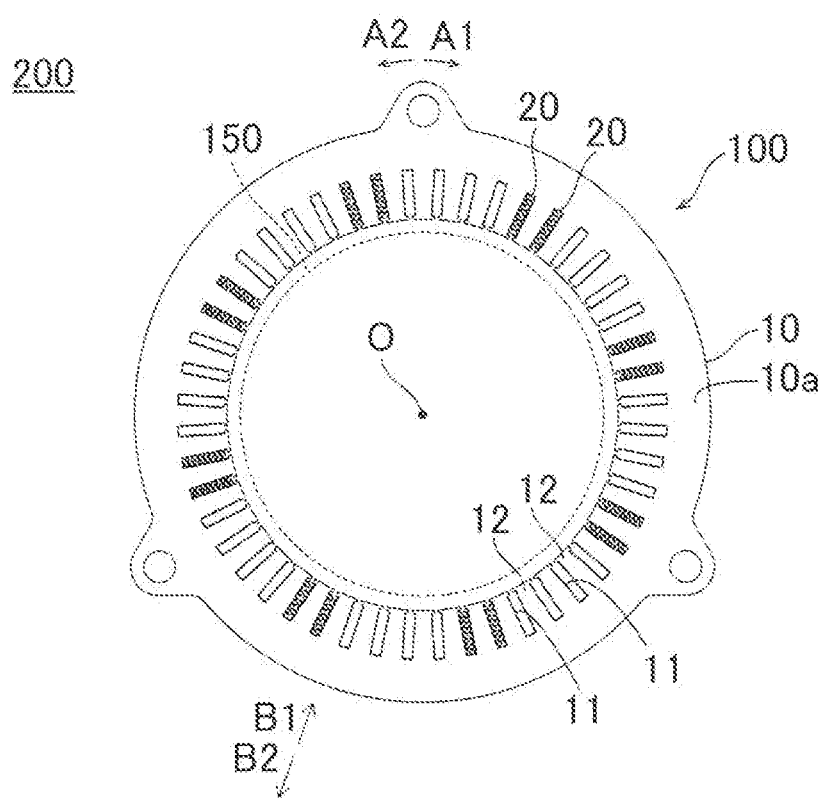
FIG. 1 is a plan view of a rotary electrical machine (stator) according to an embodiment.

In the present specification, an "axis direction" means a direction (Z direction) along a rotational axis (symbol O) of a stator core 10 (rotor 150) (see FIG. 1). A "circumferential direction" means a circumferential direction (A1 direction, A2 direction) of the stator core 10. A "radially inner side" and an "inner radial side" mean a direction (B1 direction) toward the center of the stator core 10. A "radially outer side" and an "outer radial side" mean a direction (B2 direction) toward the outside of the stator core 10.

As illustrated in FIG. 1, the rotary electric machine 200 includes a rotor 150. The rotor 150 is provided with a plurality of permanent magnets (not shown) along the circumferential direction.

The stator 100 includes the stator core 10. The stator core 10 is arranged so as to face the rotor 150 in the radial direction. The stator core 10 has a plurality of (for example, 48) slots 11. Teeth 12 are located between the adjacent slots 11.

Figure 2:
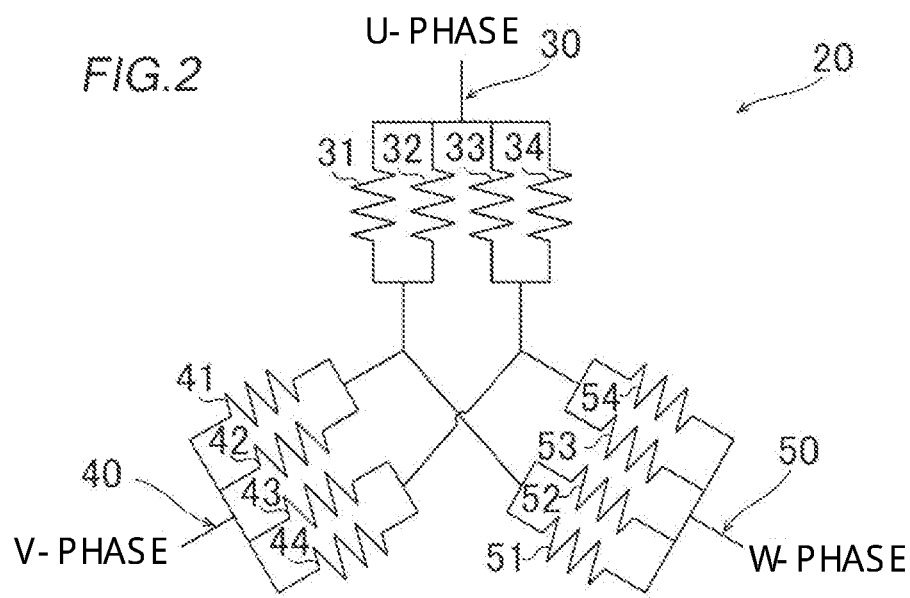
FIG. 2 is a circuit diagram of a three-phase coil connected in a Y-configuration according to the embodiment.

In the present embodiment, as illustrated in FIG. 2, a coil 20 includes three coils that are a coil 30 (U-phase), a coil 40 (V-phase), and a coil 50 (W-phase) corresponding to the three phases. The U-phase coil 30 includes a first coil portion 31, a second coil portion 32, a third coil portion 33, and a fourth coil portion 34 that are of a U-phase and that are connected in parallel with each other. The V-phase coil 40 includes a first coil portion 41, a second coil portion 42, a third coil portion 43, and a fourth coil portion 44 that are of a V-phase and that are connected in parallel with each other. The W-phase coil 50 includes a first coil portion 51, a second coil portion 52, a third coil portion 53, and a fourth coil portion 54 that are of a W-phase and that are connected in parallel with each other. The U-phase coil 30, the V-phase coil 40, and the W-phase coil 50 are connected in a Y-configuration. The specific configuration of the coil 20 will be described later.

Figure 3:
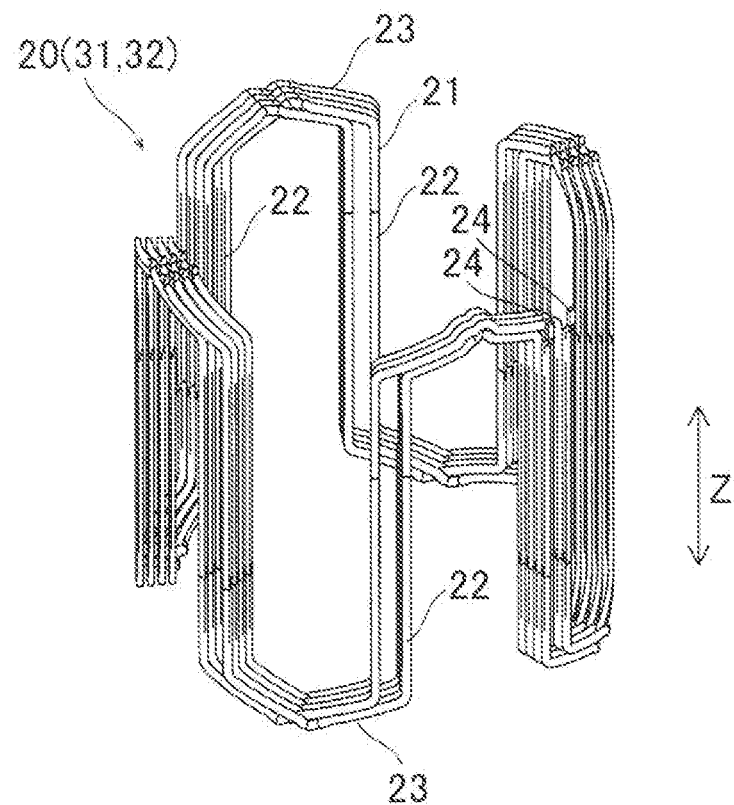
FIG. 3 is a perspective view of a coil (a first coil portion and a second coil portion) according to the embodiment.

In the present embodiment, as shown in FIG. 3, the coil 20 is configured by wave-winding a rectangular conductive wire 21. FIG. 3 illustrates the first coil portion 31 and the second coil portion 32 of the U-phase coil 30. The wave-wound coil 20 includes a plurality of slot-housed portions 22 that are formed along the axis direction and that are housed in the slots 11, and a coil end portion 23 connecting the slot-housed portions 22 to each other. The coil 20 disposed in the stator core 10 has a configuration in which after a portion corresponding to the one slot-housed portion 22 is disposed in the one slot 11 so as to extend from one side toward the other side in the axis direction, a portion corresponding to the coil end portion 23 extends over along an end face 10a of the stator core 10, and a portion corresponding to the other slot-housed portion 22 is disposed in the slot 11 so as to extend from the one side to the other side in the axis direction in another slot 11 different from the one slot 11. The rectangular conductive wire 21 is an example of a "conductive wire" in the claims.

Each end of the first coil portion 31 and the second coil portion 32 is connected to a power line 24. Alternating current power is supplied from the power line 24.

Figure 4:
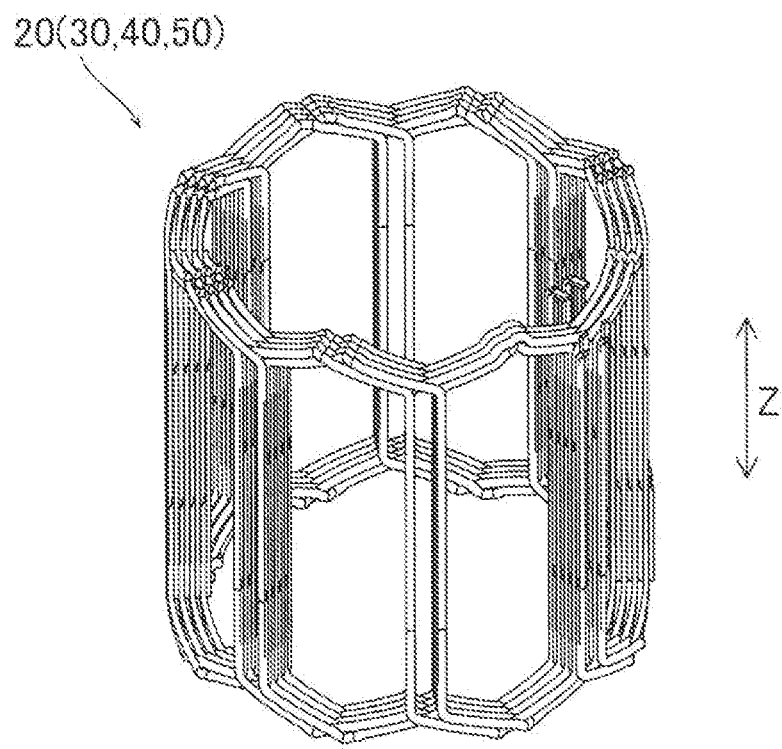
FIG. 4 is a perspective view of a coil (a first coil portion to a fourth coil portion) according to the embodiment.

As illustrated in FIG. 4, the U-phase coil 30, the first coil portion 31, the second coil portion 32, the third coil portion 33, and the fourth coil portion 34 are combined in a cage shape and are disposed in the stator core 10.

The U-phase coil 30, the V-phase coil 40, and the W-phase coil 50 have the same configuration. The U-phase coil 30 will be described below.

Figure 5:
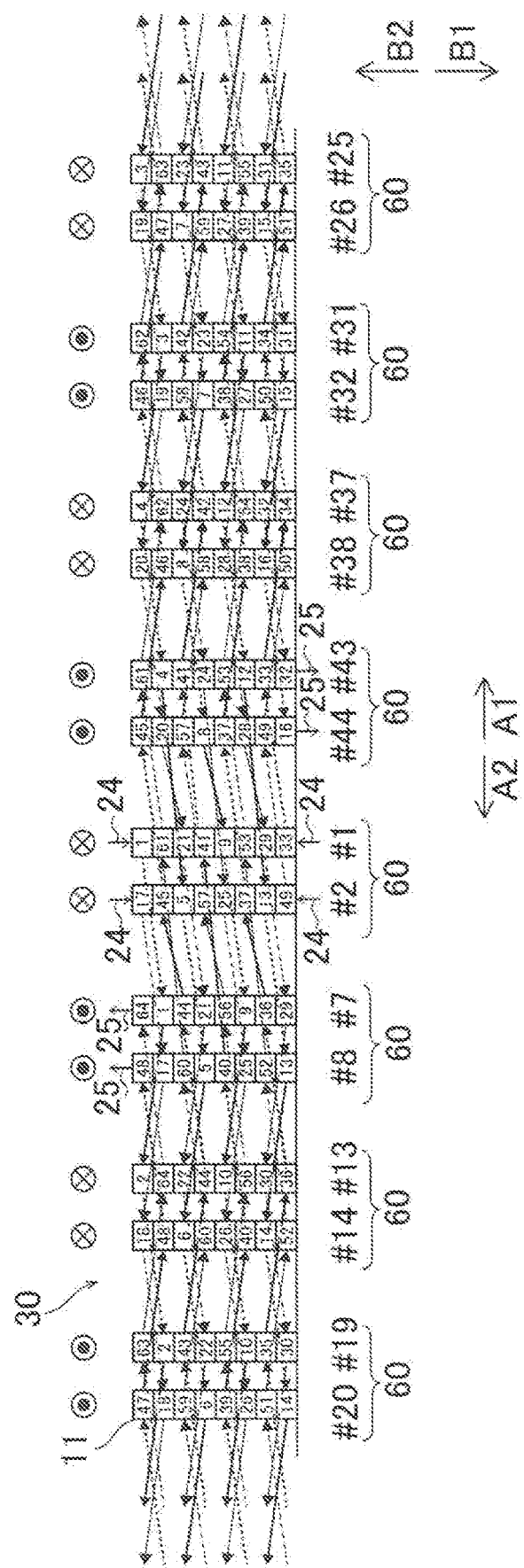
FIG. 5 is a diagram (1) illustrating an arrangement of a U-phase coil according to the embodiment.
Figure 6:
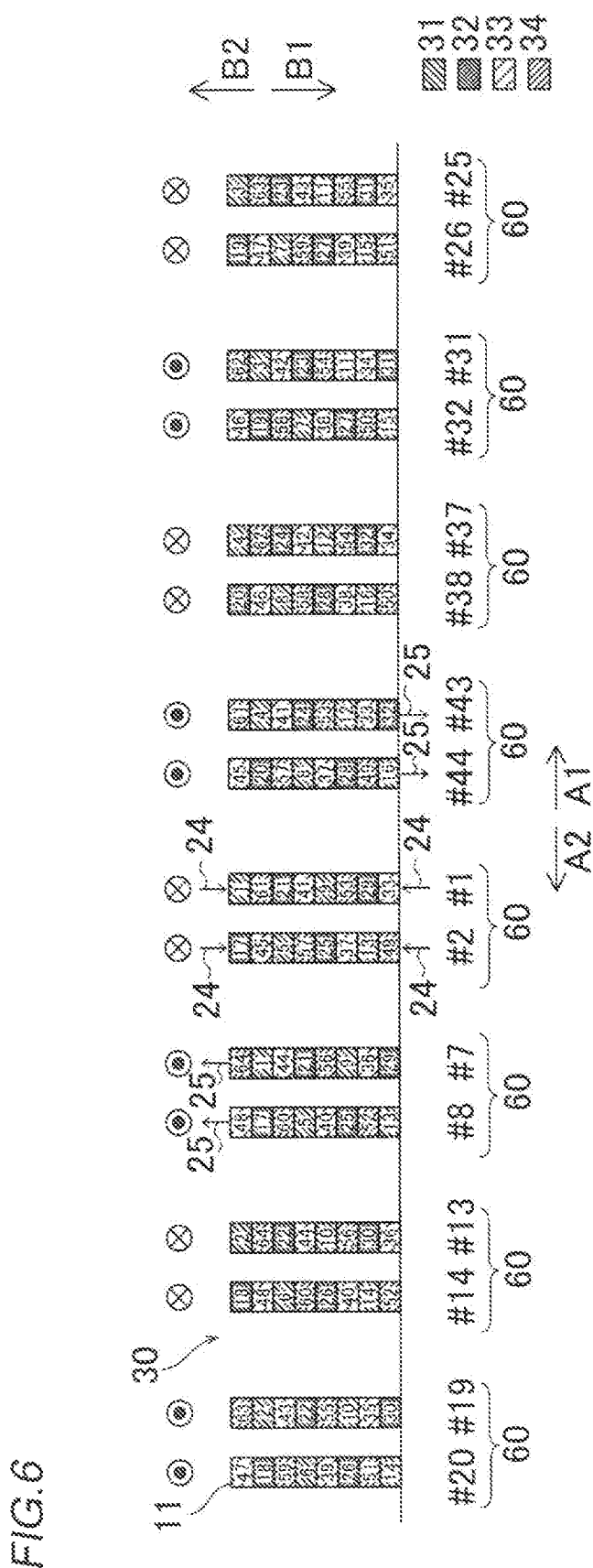
FIG. 6 is a diagram (2) illustrating an arrangement of a U-phase coil according to the embodiment.

As illustrated in FIGS. 5 and 6, the U-phase coil 30 is disposed in the first slot 11 (hereinafter, the number of the slot 11 is referred to as "#") and the slots 11 of #2, #7, #8, #13, #14, #19, #20, #25, #26, #31, #32, #37, #38, #43, and #44 among the 48 slots 11. Here, the slots 11 of #1 and #2, the slots 11 of #7 and #8, the slots 11 of #13 and #14, the slots 11 of #19 and #20, the slots 11 of #25 and #26, the slots 11 of #31 and #32, the slots 11 of #37 and #38, and the slots 11 of #43 and #44 each configure a set 60 of two slots 11 that are adjacent in the circumferential direction.

Then, the first coil portion 31 (see FIG. 7), the second coil portion 32 (see FIG. 8), the third coil portion 33 (see FIG. 9), and the fourth coil portion 34 (see FIG. 10) are each disposed so as to extend over the one set 60 consisting of two adjacent slots 11 and another set 60 consisting of two adjacent slots 11 in the circumferential direction, the other set 60 disposed at a position separated from the one set 60 by a predetermined number of slots 11.

Figure 7:
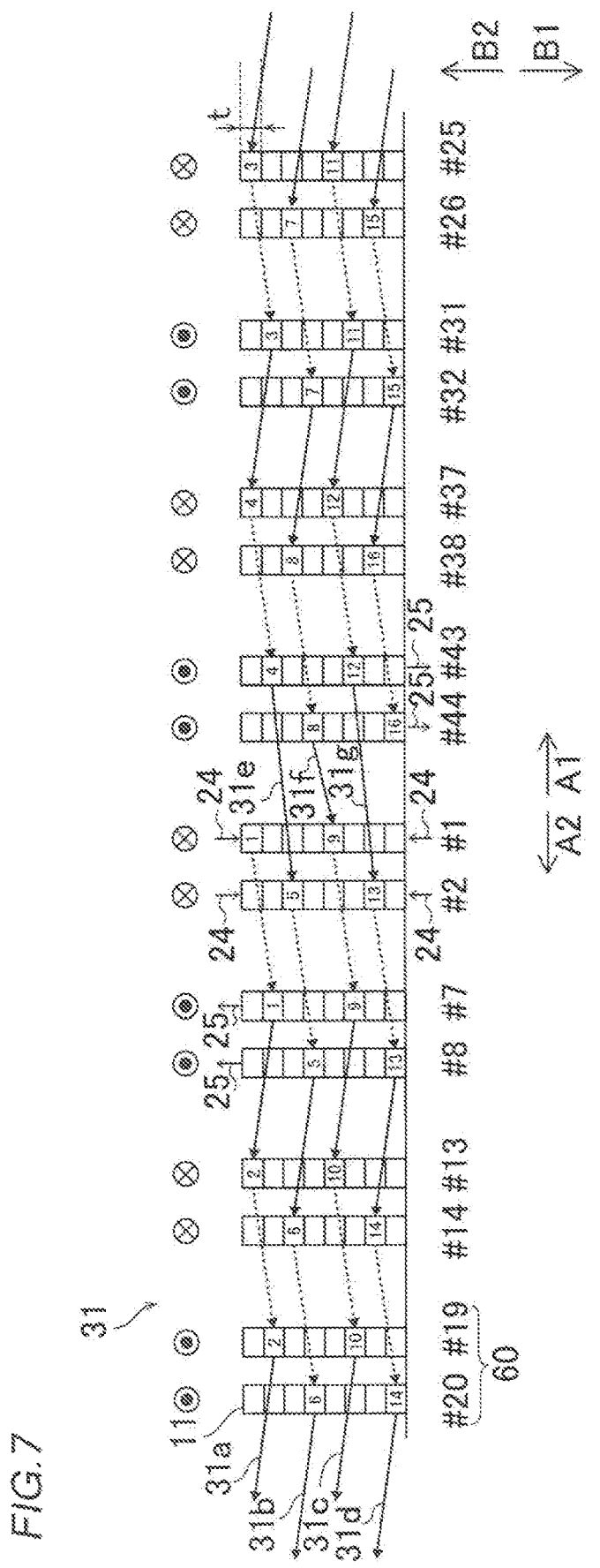
FIG. 7 is a diagram illustrating an arrangement of a U-phase first coil portion according to the embodiment.

Among the plurality of slots 11, the slot 11 on one side of the two adjacent slots 11 in the circumferential direction is a first slot (for example, #1), the slot 11 on the other side in the circumferential direction is a second slot (for example, #2), the slot 11 disposed at a position separated from the first slot to the other side in the circumferential direction by a predetermined number of slots is a third slot (for example, #7), and the slot 11 adjacent to the third slot on the other side in the circumferential direction is a fourth slot (for example, #8). In the present embodiment, as illustrated in FIG. 7, the first coil portion 31 includes one-side coil parts 31a and 31c that are disposed so as to extend over the first slot (such as #1) and the third slot (such as #7) in the circumferential direction, and other-side coil parts 31b and 31d that are disposed so as to extend over the second slot (such as #2) and the fourth slot (such as #8).

Figure 8:
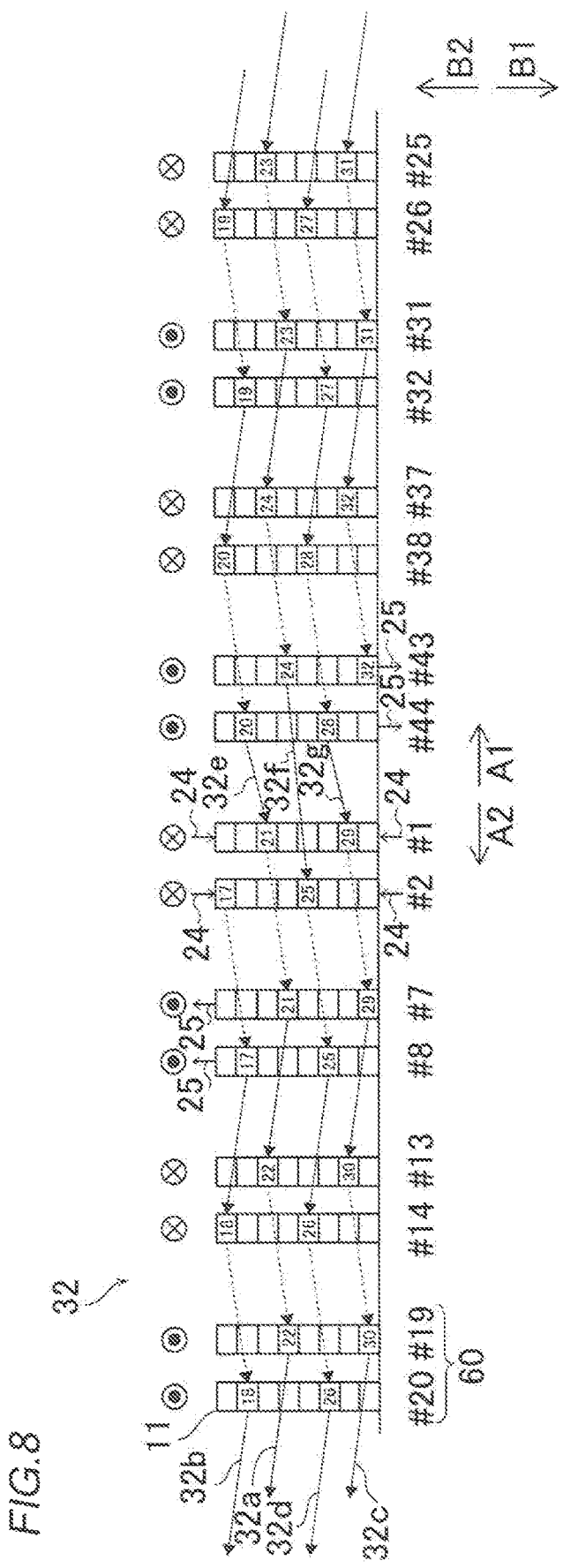
FIG. 8 is a diagram illustrating an arrangement of a U-phase second coil portion according to the embodiment.

As illustrated in FIG. 8, the second coil portion 32 includes one-side coil parts 32a and 32c that are disposed so as to extend over the first slot (such as #1) and the third slot (such as #7) in the circumferential direction, and other-side coil parts 32b and 32d that are disposed so as to extend over the second slot (such as #2) and the fourth slot (such as #8) in the circumferential direction.

Figure 9:
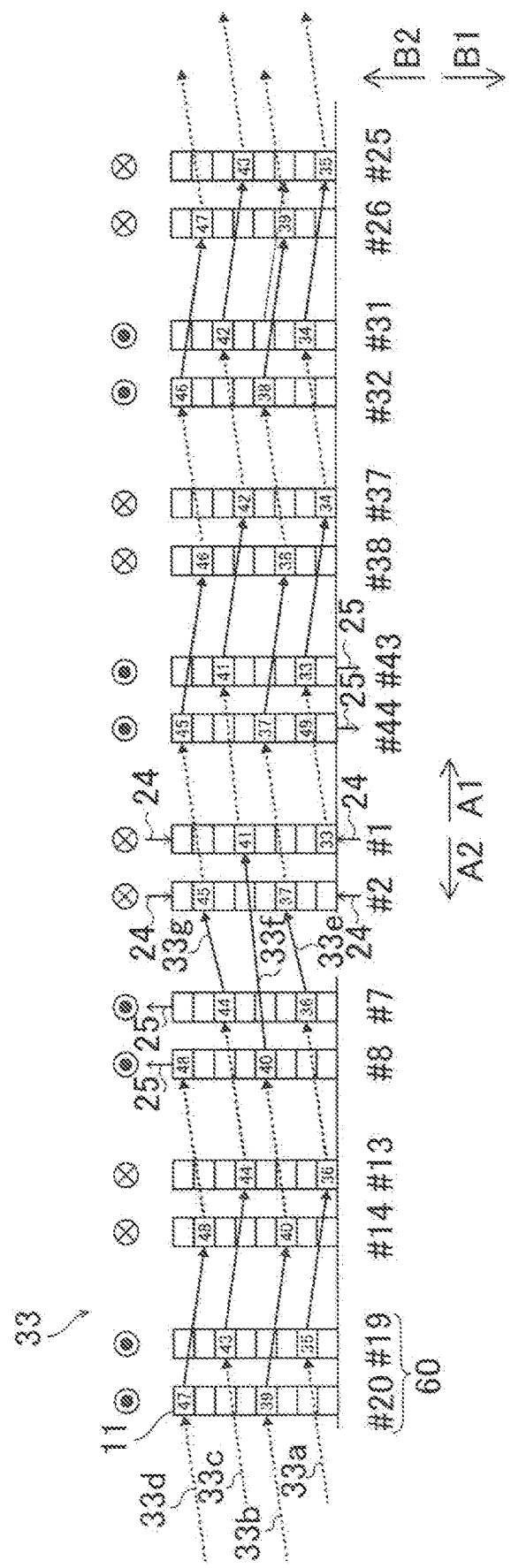
FIG. 9 is a diagram illustrating an arrangement of a U-phase third coil portion according to the embodiment.

As illustrated in FIG. 9, the third coil portion 33 includes one-side coil parts 33a and 33c that are disposed so as to extend over the first slot (such as #7) and the third slot (such as #13) in the circumferential direction, and other-side coil parts 33b and 33d that are disposed so as to extend over the second slot (such as #8) and the fourth slot (such as #14) in the circumferential direction.

Figure 10:
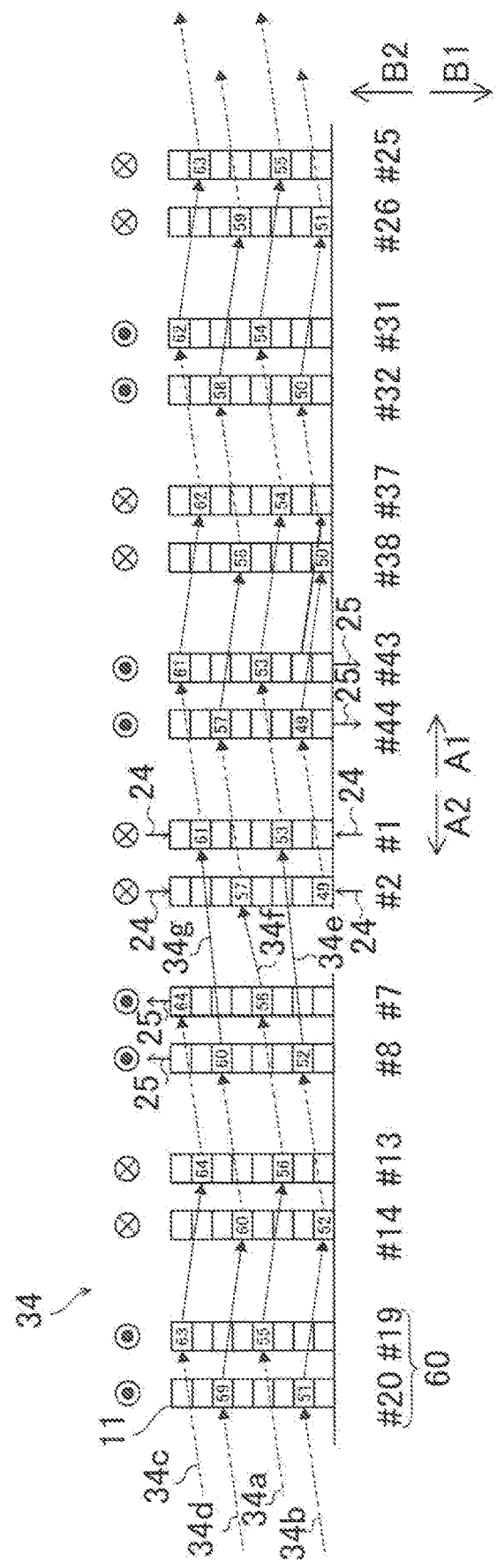
FIG. 10 is a diagram illustrating an arrangement of a U-phase fourth coil portion according to the embodiment.

As illustrated in FIG. 10, the fourth coil portion 34 includes one-side coil parts 34a and 34c that are disposed so as to extend over the first slot (such as #7) and the third slot (such as #13) in the circumferential direction, and other-side coil parts 34b and 34d that are disposed so as to extend over the second slot (such as #8) and the fourth slot (such as #14) in the circumferential direction.

In the circumferential direction, provided are the following: the one-side coil parts 31a and 31c (see FIG. 7), 32a and 32c (see FIG. 8), 33a and 33c (see FIG. 9), 34a and 34c (see FIG. 10) that are disposed so as to extend over the slots 11 on one side of two adjacent slots 11 that configure the set 60; and the other-side coil parts 31b and 31d (see FIG. 7), 32b and 32d (see FIG. 8), 33b and 33d (see FIG. 9), 34b and 34d (see FIG. 10) that are disposed so as to extend over the slots 11 on the other side of the two adjacent slots 11 that configure the set 60.

Specifically, as illustrated in FIG. 7, the U-phase first coil portion 31 includes the one-side coil part 31a that is disposed so as to extend over the slots 11 of #1, #7, #13, #19, #25, #31, #37, and #43, which are represented by turn numbers 1 to 4, on the one side (A1 direction side) among the two slots 11. Solid line arrows in FIGS. 7 to 10 indicate that the coil end portions 23 connecting the slot-housed portions 22 to each other are arranged on one side of the stator core 10 in the axis direction. Dotted line arrows in FIGS. 7 to 10 indicate that the coil end portions 23 connecting the slot-housed portions 22 are arranged on the other side of the stator core 10 in the axis direction. The directions of the arrows indicate the directions in which the rectangular conductive wire 21 is wound (the direction in which current flows). That is, in the first coil portion 31, the rectangular conductive wire 21 is wound from the A1 direction side to the A2 direction side. In FIG. 7, the numbers 1 to 16 described in the slots 11 indicate the turn numbers of the first coil portion 31. For example, the number "1" represents the first turn of the first coil portion 31, and the number "2" represents the second turn of the first coil portion 31.

The U-phase first coil portion 31 also includes the other side coil part 31b that is disposed so as to extend over the slots 11 of #2, #8, #14, #20, #26, #32, #38, and #44, which are represented by the turn numbers 5 to 8, on the other side (A2 direction side) among the two slots 11. The U-phase first coil portion 31 further includes the one side coil part 31c that is disposed so as to extend over the slots 11 of #1, #7, #13, #19, #25, #31, #37, and #43, which are represented by the turn numbers 9 to 12, on the one side (A1 direction side) among the two slots 11. The U-phase first coil portion 31 also includes the other side coil part 31d that is disposed so as to extend over the slots 11 of #2, #8, #14, #20, #26, #32, #38 and #44, which are represented by the turn numbers 13 to 16, on the other side (A2 direction side) among the two slots 11. A part of the first coil portion 31 corresponding to the turn number 1 is connected to the power line 24 (downward arrow in FIG. 7), and a part of the first coil portion 31 corresponding to the turn number 16 is connected to a neutral line 25.

In the present embodiment, the one-side coil parts 31a and 31c and the other-side coil parts 31b and 31d are each disposed so as to extend over the slots 11 (extend over the first slot and the third slot, and extend over the second slot and the fourth slot) while the position in the radial direction is alternately changed between the inner radial side and the outer radial side in the slot 11. Specifically, the one-side coil portion parts 31a and 31c and the other-side coil parts 31b and 31d are each disposed in the slot 11 so as to extend over the slots 11 while the position in the radial direction is alternately changed between the inner radial side and the outer radial side by a thickness t of the rectangular conductive wire 21 in the radial direction.

For example, in the one-side coil parts 31a represented by the turn numbers 1 to 4, the part with the turn number 1 is disposed in the slot 11 of #1, at the position on the outermost radial side, and is also disposed in the slot 11 of #7, at the position shifted from the outermost radial side to the inner radial side by the thickness t of the rectangular conductive wire 21. Thereafter, the one-side coil part 31a is disposed in the slot 11 of #13, at the position on the outermost radial side, and in the slot 11 of #19, at the position shifted from the outermost radial side to the inner radial side by the thickness t of the rectangular conductive wire 21. Further, the one-side coil part 31a is disposed in the slot 11 of #25, at the position on the outermost radial side, and in the slot 11 of #31, at the position shifted from the outermost radial side to the inner radial side by the thickness t of the rectangular conductive wire 21. The one-side coil part 31a is disposed in the slot 11 of #37, at the position on the outermost radial side, and in the slot 11 of #43, at the position shifted from the outermost radial side to the inner radial side by the thickness t of the rectangular conductive wire 21.

As with the one-side coil parts 31a, the other-side coil parts 31b represented by the turn numbers 5 to 8, the one-side coil parts 31c represented by the turn numbers 9 to 12, and the other-side coil parts 31d represented by the turn numbers 13 to 16 are also disposed in the slots 11 so as to extend over the slots 11 while the position in the radial direction is alternately changed between the inner radial side and the outer radial side by the thickness t of the rectangular conductive wire 21.

In the present embodiment, the same number of the one-side coil parts and the other-side coil parts are provided. Specifically, in the first coil portion 31, two one-side coil parts 31a and 31c and two other-side coil parts 31b and 31d are provided. In the slot 11, the one-side coil parts and the other-side coil parts are alternately disposed in the radial direction. Specifically, in the adjacent slots 11 that configure the set 60, the one-side coil part 31a, the other-side coil part 31b, the one-side coil part 31c, and the other-side coil part 31d are disposed in this order from the outer radial side to the inner radial side.

In the present embodiment, the one-side coil parts 31a and 31c, and the other-side coil parts 31b and 31d are each disposed so as to extend over the slots 11 at six-pitch intervals that are mutually the same. For example, in the one-side coil part 31a, the part corresponding to the turn number 1 is disposed so as to extend over from the slot 11 of #1 to the slot 11 of #7 (six pitches). In the other-side coil part 31b, the part corresponding to the turn number 5 is disposed so as to extend over from the slot 11 of #2 to the slot 11 of #8 (six pitches).

In the first coil portion 31, parts in which switching occurs between the one-side coil part and the other side coil part are disposed so as to extend over the slots 11 at pitch intervals different from six-pitch intervals. Specifically, a part 31e in which switching occurs from the one-side coil part 31a to the other-side coil part 31b (the part in which switching occurs from the turn number 4 to the turn number 5) is provided so as to extend over the slot 11 of #43 (third slot) to the slot 11 of #2 (second slot) (that is, at a seven-pitch interval). A part 31f in which switching occurs from the other-side coil part 31b to the one-side coil part 31c (the part in which switching occurs from the turn number 8 to the turn number 9) is provided so as to extend over from the slot 11 of #44 (fourth slot) to the slot 11 of #1 (first slot) (that is, at a five-pitch interval). A part 31g in which switching occurs from the one-side coil part 31c to the other-side coil part 31d (the part in which switching occurs from the turn number 12 to the turn number 13) is provided so as to extend over the slot 11 of #43 (third slot) to the slot 11 of #2 (second slot) (that is, at a seven-pitch interval). That is, in the first coil portion 31, two parts with seven-pitch intervals are provided, and one part with a five-pitch interval is provided.

The configuration of the second coil portion 32, the third coil portion 33, and the fourth coil portion 34 are substantially the same as that of the first coil portion 31. Thus, the differences from the first coil portion 31 will be described below.

As illustrated in FIG. 8, in the two slots 11 that configure the set 60 in the second coil portion 32, the other-side coil part 32b (turn numbers 17 to 20), the one-side coil part 32a (turn numbers 21 to 24), the other-side coil part 32d (turn numbers 25 to 28), and the one-side coil part 32c (turn numbers 29 to 32) are disposed in this order, from the outer radial side toward the inner radial side. A part 32e in which switching occurs from the other-side coil part 32b to the one-side coil part 32a (the part in which switching occurs from the turn number 20 to the turn number 21) is provided so as to extend over the slot 11 of #44 to the slot 11 of #1 (that is, at a five-pitch interval). A part 32f in which switching occurs from the one-side coil part 32a to the other-side coil part 32d (the part in which switching occurs from the turn number 24 to the turn number 25) is provided so as to extend over from the slot 11 of #43 to the slot 11 of #2 (that is, at a seven-pitch interval). A part 32g in which switching occurs from the other-side coil part 32d to the one-side coil part 32c (the part in which switching occurs from the turn number 28 to the turn number 29) is provided so as to extend over from the slot 11 of #44 to the slot 11 of #1 (that is, at a five-pitch interval). That is, in the second coil portion 32, one part with a seven-pitch interval is provided, and two parts with five-pitch intervals are provided.

Unlike the first coil portion 31 and the second coil portion 32, in the third coil portion 33 (see FIG. 9) and the fourth coil portion 34 (see FIG. 10), the rectangular conductive wires 21 are wound from the A2 direction side to the A1 direction side. That is, the direction of the current flowing in the third coil portion 33 and the fourth coil portion 34 is different from the direction of the current flowing in the first coil portion 31 and the second coil portion 32 (the directions are opposite).

As illustrated in FIG. 9, in the two slots 11 that configure the set 60 in the third coil portion 33, the one-side coil part 33a (turn numbers 33 to 36), the other-side coil part 33b (turn numbers 37 to 40), the one-side coil part 33c (turn numbers 41 to 44), and the other-side coil part 33d (turn numbers 45 to 48) are disposed in this order, from the inner radial side toward the outer radial side. A part 33e in which switching occurs from the one-side coil part 33a to the other-side coil part 33b (the part in which switching occurs from the turn number 36 to the turn number 37) is provided so as to extend over from the slot 11 of #7 to the slot 11 of #2 (that is, at a five-pitch interval). A part 33f in which switching occurs from the other-side coil part 33b to the one-side coil part 33c (the part in which switching occurs from the turn number 40 to the turn number 41) is provided so as to extend over from the slot 11 of #8 to the slot 11 of #1 (that is, at a seven-pitch interval). A part 33g in which switching occurs from the one-side coil part 33c to the other-side coil part 33d (the part in which switching occurs from the turn number 44 to the turn number 45) is provided so as to extend over from the slot 11 of #7 to the slot 11 of #2 (that is, at a five-pitch interval). That is, in the third coil portion 33, one part with a seven-pitch interval is provided, and two parts with five-pitch intervals are provided.

As illustrated in FIG. 10, in the two slots 11 that configure the set 60 in the fourth coil portion 34, the other-side coil part 34b (turn numbers 49 to 52), the one-side coil part 34a (turn numbers 53 to 56), the other-side coil part 34d (turn numbers 57 to 60), and the one-side coil part 34c (turn numbers 61 to 64) are disposed in this order, from the inner radial side to the outer radial side. A part 34e in which switching occurs from the other-side coil part 34b to the one-side coil part 34a (the part in which switching occurs from the turn number 52 to the turn number 53) is provided so as to extend over from the slot 11 of #8 to the slot 11 of #1 (that is, at a seven-pitch interval). A part 34f in which switching occurs from the other-side coil part 34a to the one-side coil part 34d (the part in which switching occurs from the turn number 56 to the turn number 57) is provided so as to extend over from the slot 11 of #7 to the slot 11 of #2 (that is, at a five-pitch interval). A part 34g in which switching occurs from the other-side coil part 34d to the one-side coil part 34c (the part in which switching occurs from the turn number 60 to the turn number 61) is provided so as to extend over from the slot 11 of #8 to the slot 11 of #1 (that is, at a seven-pitch interval). That is, in the fourth coil portion 34, two parts with seven-pitch intervals are provided, and one part with a five-pitch interval is provided.

As described above, in each of the first coil portion 31, the second coil portion 32, the third coil portion 33, and the fourth coil portion 34, two one-side coil parts and two other-side coil parts are provided, and in the two slots 11 that configure the set 60, the one-side coil part and the other-side coil part are alternately disposed in the radial direction. Thereby, the configurations of the first coil portion 31, the second coil portion 32, the third coil portion 33, and the fourth coil portion 34 are the same. Thus, the difference in resistance of the first coil portion 31, the second coil portion 32, the third coil portion 33, and the fourth coil portion 34 is reduced. As a result, circulating current in the first coil portion 31, the second coil portion 32, the third coil portion 33, and the fourth coil portion 34 is reduced (prevented).

In the present embodiment, as illustrated in FIG. 7, in the first coil portion 31, the one-side coil parts 31a and 31c are configured by being disposed so as to extend alternately over all the first slots (#1, #13, #25, W37) and all the third slots (#7, #19, #31, #43) disposed in the stator core 10 for one round of the stator core 10. The other-side coil parts 31b and 31d are configured by being disposed so as to extend alternately over all the second slots (#2, #14, #26, #38) and all the fourth slots (#8, #20, #32, #44) disposed in the stator core 10 for one round of the stator core 10, and by being disposed in the slot 11 at the positions shifted in the radial direction from the parts at which the one-side coil parts 31a and 31c are disposed. The second coil portion 32, the third coil portion 33, and the fourth coil portion 34 have the same configuration.

Next, the specific configuration of the coil 20 will be described.

Figure 11:
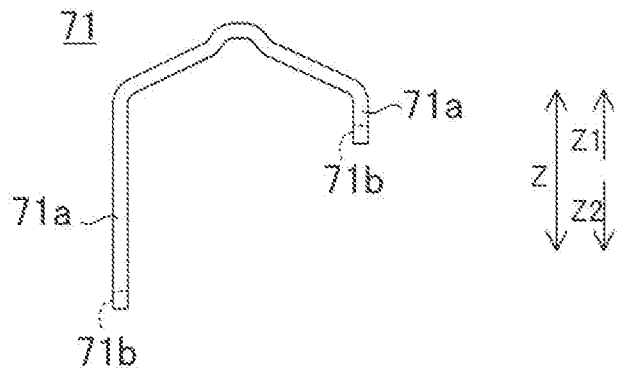
FIG. 11 is a diagram illustrating a first segment conductor according to the embodiment.
Figure 12:
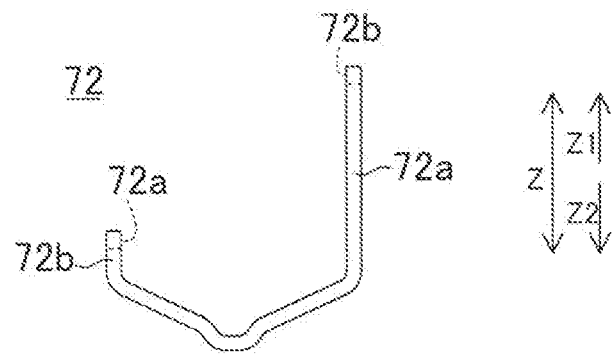
FIG. 12 is a diagram illustrating a second segment conductor according to the embodiment.
Figure 13:
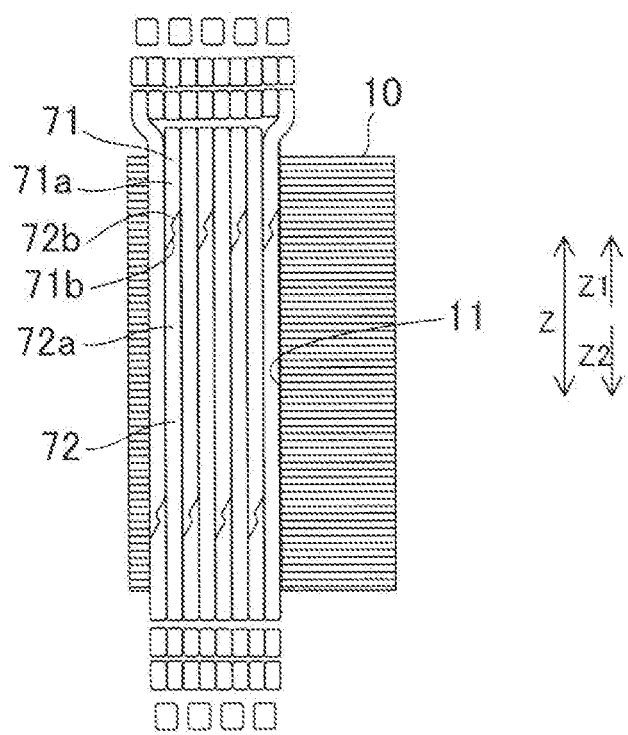
FIG. 13 is a cross-sectional view illustrating a state in which a coil according to the embodiment is disposed in a slot.

As illustrated in FIGS. 11 and 12, the coil 20 includes a plurality of first segment conductors 71 and a plurality of second segment conductors 72. The first segment conductor 71 includes a pair of first leg portions 71a that are disposed on one side (Z1 direction side) in the center axis direction of the stator core 10 and that extend to the other side (Z2 direction side) of the center axis direction. The lengths of the first leg portions 71a are different from each other, and the first segment conductor 71 has a generally J shape. The second segment conductor 72 includes a pair of second leg portions 72a that are disposed on the other side in the center axis direction of the stator core 10 and that extend to the one side in the center axis direction. The lengths of the second leg portions 72a are different from each other, and the second segment conductor 72 has a generally J shape. As illustrated in FIG. 13, a first surface 71b provided on a tip end side of each of the first leg portions 71a of the first segment conductors 71 and a second surface 72b provided on a tip end side of each of the second leg portions 72a of the second segment conductors 72 are joined in the slot 11.

Effects of the Present Embodiment

In the present embodiment, the following effects can be obtained. The effects of the U-phase coil (30) will be mainly described below. The effects of the V-phase coil (40) and the W-phase coil (50) are the same as the effects of the U-phase coil (30).

In the present embodiment, as described above, the first coil portion (31), the second coil portion (32), the third coil portion (33), and the fourth coil portion (34) are configured by wave-winding the conductive wire (21). Here, the wave-wound conductive wire (21) disposed in the stator core (10) is configured such that after being disposed in the one slot (11) so as to extend from the one side to the other side in the axis direction, the wave-wound conductive wire (21) is disposed in the slot (11) so as to extend along the end face (10a) of the stator core (10) and extend from the other side toward the one side in the axis direction, in another slot (11) different from the one slot (11). The conducting wire (21) described above is repeatedly disposed for a plurality of times with wave-winding so that the conductive wire (21) is disposed over the entire circumference of the stator core (10). That is, with the wave-winding, the number of times of passing over the other same-phase coils (20, 30, 40, 50) connected in parallel can be reduced, compared to concentric winding. Thus, an increase of the length in the central axis direction or the radial direction of the stator (100) can be suppressed. Also, the first coil portion (31), the second coil portion (32), the third coil portion (33), and the fourth coil portion (34) each include the following: the one-side coil parts (31a, 31c, 32a, 32c, 33a, 33c, 34a, 34c) that are disposed so as to extend over the first slot and the third slot; and the other-side coil parts (31b, 31d, 32b, 32d, 33b, 33d, 34b, 34d) that are disposed so as to extend over the second slot and the fourth slot. Thereby, it is possible to suppress the relationship (balance) between the position of the coil with respect to the center of the magnetic pole from being varied, unlike the case where each of the first coil portion (31), the second coil portion (32), the third coil portion (33), and the fourth coil portion (34) extends over only the first slot (third slot) on the one side or only the second slot (fourth slot) on the other side in the circumferential direction among the two adjacent slots (11) that configure the set (60). As a result, the generation of circulating current in the first coil portion (31), the second coil portion (32), the third coil portion (33), and the fourth coil portion (34) is reduced, and thus, generation of noise and vibration is reduced. It is therefore possible to reduce the generation of noise and vibration caused by circulating current in the coil (30), while suppressing an increase in the size of the stator (100) in the center axis direction or the radial direction.

In the present embodiment, as described above, the one-side coil parts (31a, 31c, 32a, 32c, 33a, 33c, 34a, 34c) and the other-side coil parts (31b, 31d, 32b, 32d, 33b, 33d, 34b, 34d) are disposed in the slot (11) so as to extend over the slots (11) (extend over the first slot and the third slot, or extend over the second slot and the fourth slot), while the positions are alternately changed between the inner radial side and the outer radial side. With this configuration, in the slot (11), other coil parts can be disposed in a part offset to the inner radial side or the outer radial side of the one-side coil parts (31a, 31c, 32a, 32c, 33a, 33c, 34a, 34c) and the other-side coil parts (31b, 31d, 32b, 32d, 33b, 33d, 34b, 34d). Thus, the coil parts of each of the first coil portion (31) to the fourth coil portion (34) can be easily disposed in the slot (11).

Further, in the present embodiment, as described above, the one-side coil parts (31a, 31c, 32a, 32c, 33a, 33c, 34a, 34c) and the other-side coil parts (31b, 31d, 32b, 32d, 33b, 33d, 34b, 34d) are disposed in the slot (11) so as to extend over the slots (11) while the position in the radial direction is alternately changed between the inner radial side and the outer radial side by the thickness t of the conductive wire (21) in the radial direction. With such a configuration, it is possible to suppress the coil parts from intersecting with each other, unlike the case in which the one-side coil parts (31a, 31c, 32a, 32c, 33a, 33c, 34a, 34c) and the other-side coil parts (31b, 31d, 32b, 32d, 33b, 33d, 34b, 34d) are disposed such that the position in the radial direction is alternately changed between the inner radial side and the outer radial side by a distance larger than the thickness t of the conductive wire (21).

In the present embodiment, as described above, the one-side coil parts (31*a*, 31*c*, 32*a*, 32*c*, 33*a*, 33*c*, 34*a*, 34*c*) are disposed so as to extend over the slots (11) (the first slot and the third slot) at first pitch intervals that are mutually the same. The other-side coil parts (31*b*, 31*d*, 32*b*, 32*d*, 33*b*, 33*d*, 34*b*, 34*d*) are disposed so as to extend over the slots (11) (the second slot and the fourth slot) at the first pitch intervals that are mutually the same. In the first coil portion (31), the second coil portion (32), the third coil portion (33), and the fourth coil portion (34), the parts (31*e* to 31*g*, 32*e* to 32*g*, 33*e* to 33*g*, 34*e* to 34*g*) in which switching occurs between the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) are disposed so as to extend over the slots (11) at a second pitch interval that is different from the first pitch interval. Here, the parts (31*e* to 31*g*, 32*e* to 32*g*, 33*e* to 33*g*, 34*e* to 34*g*) in which switching occurs between the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) are the parts in which the slot (11) provided with the coil parts is switched from the one side to the other side (or from the other side to the one side) in the circumferential direction. Thus, the second pitch interval is different from the first pitch interval at which the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) are disposed. It is thus possible to easily connect the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) by disposing the parts (31*e* to 31*g*, 32*e* to 32*g*, 33*e* to 33*g*, 34*e* to 34*g*) in which switching occurs between the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) so that the parts (31*e* to 31*g*, 32*e* to 32*g*, 33*e* to 33*g*, 34*e* to 34*g*) extend over the slots (11) (the third slot and the second slot, or the fourth slot and the first slot) at the second pitch interval that is different from the first pitch interval.

In the present embodiment, as described above, the same number of the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) are provided. With such a configuration, it is possible to dispose the coil parts of the first coil portion (31) to the fourth coil portion (34) in a well-balanced manner, unlike the case where the number of the one-side coil parts (31*a*, 31*c*, 32*a*, 32*c*, 33*a*, 33*c*, 34*a*, 34*c*) and the number of the other-side coil parts (31*b*, 31*d*, 32*b*, 32*d*, 33*b*, 33*d*, 34*b*, 34*d*) are different.

In the present embodiment, as described above, in the slot (11), the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) are alternately disposed in the radial direction. With such a configuration, it is possible to further reduce generation of circulating current since the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) are disposed in a well-balanced manner, unlike the case where the one-side coil parts (31*a*, 31*c*, 32*a*, 32*c*, 33*a*, 33*c*, 34*a*, 34*c*) are disposed only on the inner radial side or only the outer radial side of the slot (11) or where the other-side coil parts (31*b*, 31*d*, 32*b*, 32*d*, 33*b*, 33*d*, 34*b*, 34*d*) are disposed only on the inner radial side or only on the outer radial side of the slot (11).

In the present embodiment, as described above, the three coils (30, 40, 50) corresponding to three phases are provided. With such a configuration, in the stator (100) having the three-phase coils (30, 40, 50), the generation of noise and vibration caused by circulating current in the coils (30, 40, 50) can be reduced.

In the present embodiment, as described above, the coils (30, 40, 50) are configured by the rectangular conductive wires (21) that are wave-wound. With such a configuration, since the space factor of the rectangular conductive wire (21) in the slot (11) is relatively high, it is possible to reduce generation of noise and vibration caused by circulating current in the coils (30, 40, 50) while relatively increasing the space factor of the rectangular conductive wire (21) in the slot (11).

In the present embodiment, as described above, the first surface (71*b*) provided on the tip end side of each of the first leg portions (71*a*) of the first segment conductors (71) and the second surface (72*b*) provided on the tip end side of each of the second leg portions (72*a*) of the second segment conductor (72) are joined in the slot (11). With such a configuration, the length of the coil end portion (23) in the center axis direction can be shortened, compared to when the first segment conductors (71) and the second segment conductors (72) are joined outside the slot (11).

In the present embodiment, as described above, the one-side coil parts (31*a*, 31*c*, 32*a*, 32*c*, 33*a*, 33*c*, 34*a*, 34*c*) are configured to be disposed so as to alternately extend over all of the first slots and all of the third slots disposed in the stator core (10) for one round of the stator core (10). The other-side coil parts (31*b*, 31*d*, 32*b*, 32*d*, 33*b*, 33*d*, 34*b*, 34*d*) are configured by being disposed so as to alternately extend over all of the second slots and all of the fourth slots disposed in the stator core (10) for one round of the stator core (10) and being disposed in the slot (11) at the positions shifted in the radial direction from the part in which the one-side coil parts (31*a*, 31*c*, 32*a*, 32*c*, 33*a*, 33*c*, 34*a*, 34*c*) are disposed. With such a configuration, the one-side coil parts (31*a*, 31*c*, 32*a*, 32*c*, 33*a*, 33*c*, 34*a*, 34*c*) and the other-side coil parts (31*b*, 31*d*, 32*b*, 32*d*, 33*b*, 33*d*, 34*b*, 34*d*) can be prevented from intersecting.

Modifications

The embodiment disclosed herein is by way of example in all respects and should not be interpreted as restrictive. The scope of the preferred embodiment is defined by the claims rather than by the description of the above embodiment, and includes all changes (modifications) that fall within the meaning and scope equivalent to the claims.

For example, the above-described embodiment shows an example in which the one-side coil part and the other-side coil part are disposed so as to extend over the slots while the position in the radial direction is alternately changed between the inner radial side and the outer radial side in the slot by the thickness of the rectangular conductive wire. However, the preferred embodiment is not limited to this. For example, the one-side coil part and the other-side coil part may be disposed while the position in the radial direction is alternately changed between the inner radial side and outer radial side by a distance other than the thickness of the rectangular conductive wire.

In the above embodiment, an example is shown in which the three-phase coils are provided in the stator core. However, the preferred embodiment is not limited to this. For example, coils of phases other than three phases may be provided in the stator core.

In the above-described embodiment, an example is shown in which the four coil portions (first to fourth coil portions) are provided in parallel in the coil of each phase. However, the preferred embodiment is not limited to this. For example, in the coils of each phase, a multiple of four coil portions other than four may be provided in parallel.

In the above-described embodiment, an example is shown in which each of the four coil portions (first to fourth coil portions) is wound for 16 turns. However, the preferred embodiment is not limited to this. For example, each of the four coil portions (first to fourth coil portions) may be wound for a multiple of four turns other than sixteen.

In the above-described embodiment, an example is shown in which the coil is configured of the rectangular conductive wire. However, the preferred embodiment is not limited to this. For example, the coil may be configured of a round wire or the like.

In the above-described embodiment, an example is shown in which the one-side coil part and the other-side coil part are disposed so as to extend over the slots at a five-pitch interval. However, the preferred embodiment is not limited to this. For example, the one-side coil part and the other-side coil part may be disposed so as to extend over the slots at an interval other than five pitches.

DESCRIPTION OF THE REFERENCE NUMERALS

10 Stator core
11 Slot
20, 30, 40, 50 Coil
21 Rectangular conductive wire (conductive wire)
31, 41, 51 First coil portion
31a, 31c, 32a, 32c, 33a, 33c, 34a, 34c One-side coil part
31b, 31d, 32b, 32d, 33b, 33d, 34b, 34d Other-side coil part
31e to 31g, 32e to 32g, 33e to 33g, 34e to 34g Part (in which switching occurs)
32, 42, 52 Second coil portion
33, 43, 53 Third coil portion
34, 44, 54 Fourth coil portion
60 Set
71 First segment conductor
71a First leg portion
71b First surface
72 Second segment conductor
72a Second leg portion
72b Second surface
100 Stator

The invention claimed is:

1. A stator comprising:
a stator core provided with a plurality of slots; and
a coil that is disposed in the slot of the stator core and in which a conductive wire is wave-wound, wherein
the coil includes a first coil portion, a second coil portion, a third coil portion, and a fourth coil portion that have the same phase and that are connected in parallel with each other,
among the slots, a slot on one side of the two adjacent slots in a circumferential direction is a first slot, a slot on the other side in the circumferential direction is a second slot, a slot that is disposed at a position separated from the first slot to the other side in the circumferential direction by a predetermined number of slots is a third slot, and a slot that is adjacent to the third slot on the other side in the circumferential direction is a fourth slot, and
the first coil portion, the second coil portion, the third coil portion, and the fourth coil portion each include a one-side coil part that is disposed so as to extend over the first slot and the third slot in the circumferential direction and an other-side coil part that is disposed so as to extend over the second slot and the fourth slot in the circumferential direction.

2. The stator according to claim 1, wherein
the one-side coil part is disposed in the slot so as to extend over the first slot and the third slot while a position in a radial direction is alternately changed between an inner radial side and an outer radial side, and
the other-side coil part is disposed in the slot so as to extend over the second slot and the fourth slot while a position in the radial direction is alternately changed between the inner radial side and the outer radial side.

3. The stator according to claim 2, wherein
the one-side coil part is disposed in the slot so as to extend over the first slot and the third slot while the position in the radial direction is alternately changed between the inner radial side and the outer radial side by a thickness of the conductive wire in the radial direction, and
the other-side coil part is disposed in the slot so as to extend over the second slot and the fourth slot while the position in the radial direction is alternately changed between the inner radial side and the outer radial side by the thickness of the conductive wire in the radial direction.

4. The stator according to claim 1, wherein
the one-side coil part is disposed so as to extend over the first slot and the third slot at first pitch intervals that are mutually the same,
the other-side coil part is disposed so as to extend over the second slot and the fourth slot at the first pitch intervals that are mutually the same, and
in each of the first coil portion, the second coil portion, the third coil portion, and the fourth coil portion, a part in which switching occurs between the one-side coil part and the other-side coil part is disposed so as to extend over the third slot and the second slot or the fourth slot and the first slot, at a second pitch interval that is different from the first pitch interval.

5. The stator according to claim 1, wherein the same number of the one-side coil parts and the other-side coil parts are provided.

6. The stator according to claim 1, wherein
the same number of the one-side coil parts and the other-side coil parts are provided and a plurality of the one-side coil parts and the other-side coil parts are each provided, and
in the slot, the one-side coil part and the other-side coil part are alternately disposed in the radial direction.

7. The stator according to claim 1, wherein three coils are provided so as to correspond to three phases.

8. The stator according to claim 1, wherein the coil is configured of a rectangular conductive wire that is wave-wound.

9. The stator according to claim 8, wherein the coil configured by the rectangular conductive wire includes:
a plurality of first segment conductors including a pair of first leg portions that are disposed on one side in a center axis direction of the stator core and that extend to the other side in the center axis direction; and
a plurality of second segment conductors including a pair of second leg portions that are disposed on the other side in the center axis direction of the stator core and that extend to the one side in the center axis direction, and a first surface provided on a tip end side of each of the first leg portions of the first segment conductors and a second surface provided on a tip end side of each of the second leg portions of the second segment conductors are joined in the slot.

10. The stator according to claim 1, wherein in each of the first coil portion, the second coil portion, the third coil portion, and the fourth coil portion, the one-side coil part is configured by being disposed so as to alternately extend over all of the first slots and all of the third slots disposed in the stator core for one round of the stator core, and the other-side coil part is configured by being disposed so as to alternately extend over all of the second slots and all of the fourth slots disposed in the stator core for one round of the stator core and by being disposed in the slot at a position shifted in the radial direction from a part at which the one-side coil part is disposed.

* * * * *